Figure 14:
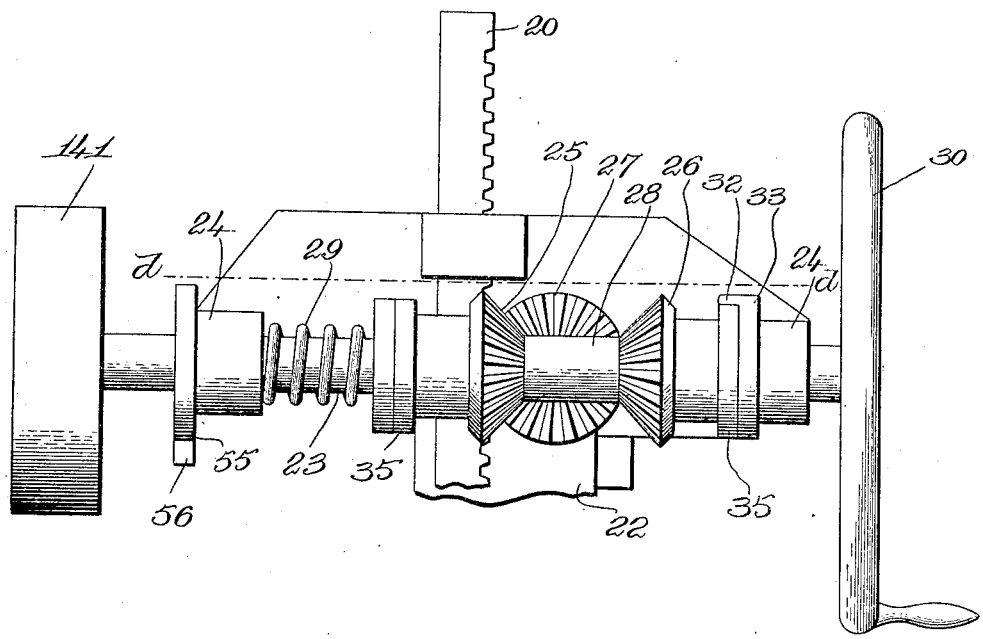

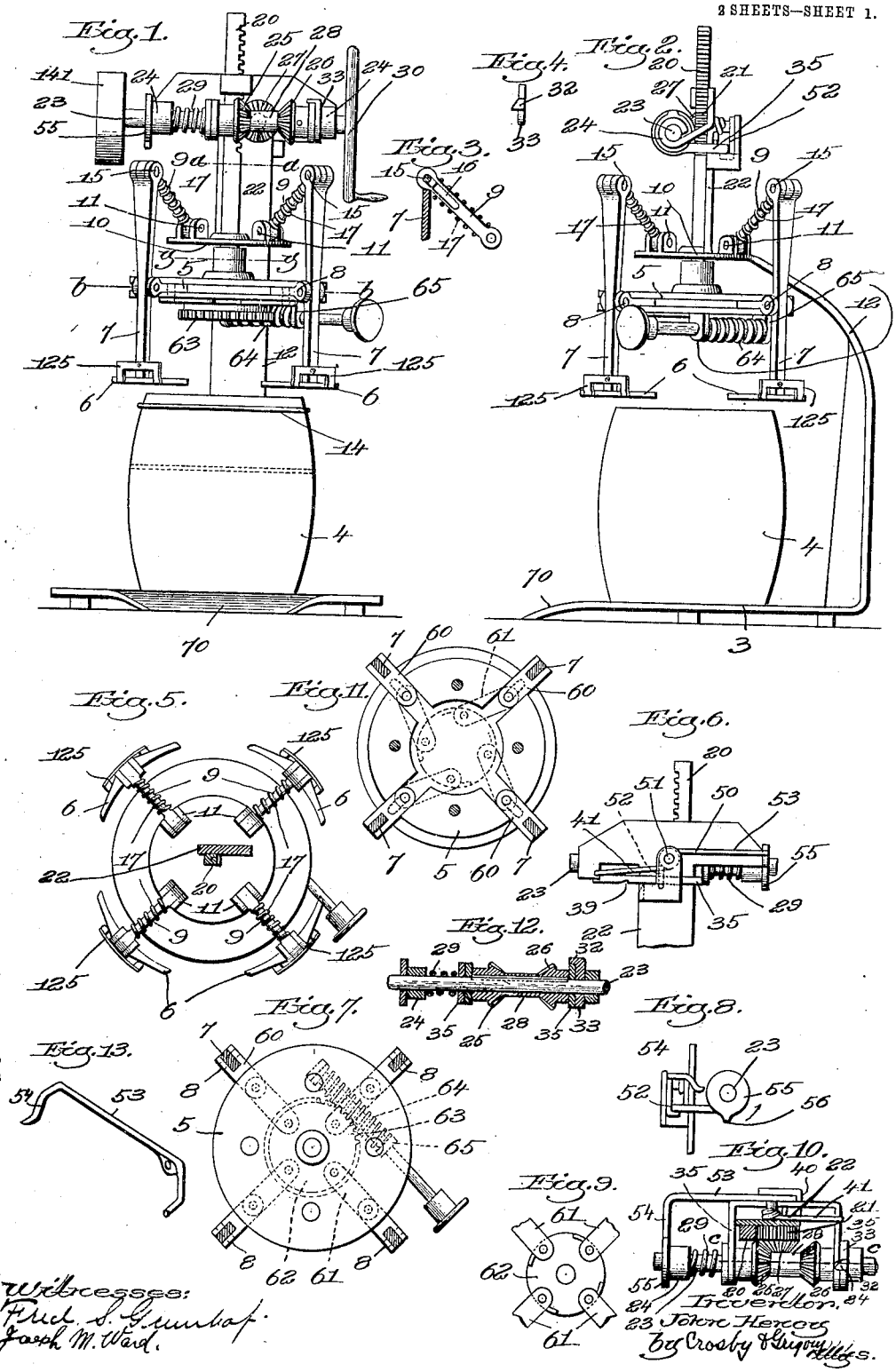

J. HENCY.
BARREL HOOPING MACHINE.
APPLICATION FILED DEC. 26, 1907.

926,187.

Patented June 29, 1909.
2 SHEETS—SHEET 2.

Witnesses:
Fred. S. Greenleaf.
Joseph M. Ward.

Inventor.
John Hency,
by Kenly & Gregory Attys.

UNITED STATES PATENT OFFICE.

JOHN HENCY, OF PERRY, NEW YORK, ASSIGNOR OF ONE-HALF TO GEORGE H. PEDDLE, OF PERRY, NEW YORK.

BARREL-HOOPING MACHINE.

No. 926,187.   Specification of Letters Patent.   Patented June 29, 1909.

Application filed December 26, 1907. Serial No. 408,172.

*To all whom it may concern:*

Be it known that I, JOHN HENCY, a citizen of the United States, and a resident of Perry, in the county of Wyoming and State of New York, have invented an Improvement in Barrel-Hooping Machines, of which the following description, in connection with the accompanying drawing, is a specification, like numerals on the drawing representing like parts.

This invention has for its object to provide a novel machine for applying hoops to barrels, casks, etc., which machine is adapted to quickly and expeditiously force the hoops firmly on the barrel.

Figure 15:
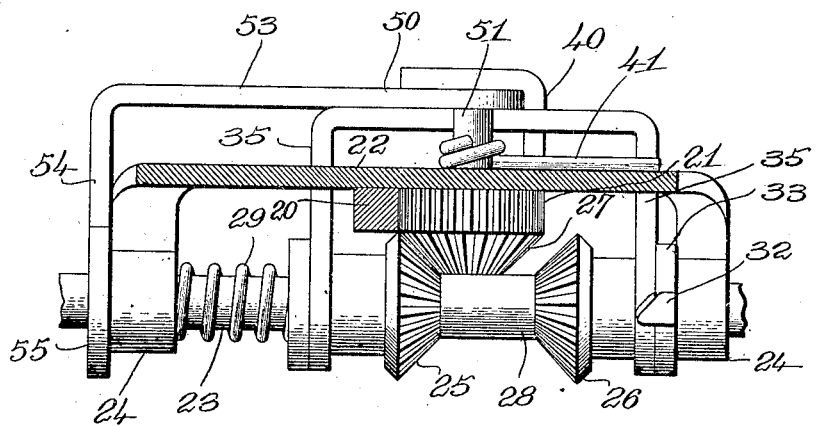

One embodiment of my invention will first be described and then the novel features thereof will be pointed out in the appended claims.
In the drawings, Figure 1 is a front view of a machine embodying my invention; Fig. 2 is a side view thereof; Fig. 3 is a detail of one of the arms supporting the hoop-engaging jaws; Fig. 4 is a detail view of the reversing cam of the driving mechanism; Fig. 5 is a section on the line $a$—$a$, Fig. 1; Fig. 6 is a detail showing part of the reversing mechanism; Fig. 7 is a section on the line $y$—$y$, Fig. 1; Fig. 8 is an end view of Fig. 6 looking from the left; Fig. 9 is a detail showing the manner of adjusting the hoop-engaging jaws for different sizes of barrels; Fig. 10 is a section on the line $x$—$x$, Fig. 1; Fig. 11 is a section on the line $b$—$b$, Fig. 1;
Fig. 12 is a section on the line $c$—$c$, Fig. 10; Fig. 13 is a detail view of the releasing device 50. Fig. 14 is an enlarged front elevation of the upper portion of the apparatus showing the reversing gear; Fig. 15 is a section on the line $d$—$d$, Fig. 14.

The machine as herein shown comprises a base 3 on which the barrel 4 to be hooped is adapted to rest, a vertically rising and falling head 5 carrying hoop-engaging jaws 6, and means to lower said head thereby to bring the jaws against a hoop which has been placed on the barrel and force the hoop firmly home and then to raise the head thereby lifting the jaws above the barrel to permit the hooped barrel to be removed from the base and an unhooped barrel to be placed thereon.

I have shown herein four hoop-engaging jaws each curved slightly to fit the contour of the barrel, and each jaw is pivotally carried at the end of an arm 7 which in turn is pivoted intermediate of its ends to the head 5, as at 8, and the upper end of which is connected to a link 9 which in turn is pivoted to a fixed head 10, as at 11. Each arm 7 also carries a spring member 125 which has two yielding arms that engage the jaw 6 and thus yieldingly keep it centered.

This fixed head 10 may be supported in any suitable way, and as herein shown it is sustained by the stand or arm 12 which rises from the base 3. When the head 5 is in its elevated position the arms 7 and links 9 occupy the position shown in Figs. 1 and 2. As the head 5 is lowered the arm 7 with the hoop-engaging jaws are carried downwardly thus bringing the jaws against a hoop 14 which has been placed on a barrel 4 supported by the base 3, said jaws by engaging the hoop operating to drive the latter tight. I have herein shown each arm 7 as connected to its link 9 by a sliding pivotal connection which will permit the jaws 6 to yield outwardly slightly during their driving movement and thus to follow closely the shape of the barrel.

As herein shown each arm 7 has at its upper end a pivotal pin 15 which extends through a slot 16 formed in the link 9, and each arm is acted on by a spring 17 which surrounds the link 9 and tends to force the upper end of the arm 7 outwardly. With such a construction it will be observed that the springs 17 serve to yieldingly hold the jaws 6 against the barrel as the head 5 is depressed but that the jaws may yield outwardly sufficiently to accommodate the shape of the barrel. For raising and lowering the head 5, the latter has connected thereto a rack bar 20 which extends up through the fixed head 10 and has engagement at its upper end with a driving pinion 21 that is journaled in the arm or bracket 22 extending upwardly from the fixed head 10. This driving pinion 21 is adapted to be operated by suitable driving mechanism which, in the present embodiment of my invention, is arranged to rotate said pinion in one direction for a sufficient length of time to carry the rack bar 20 and head 5 to the lower limit of its movement and then to reverse automatically the direction of rotation of said driving pinion thereby to elevate the head 5. For thus driving the pinion 21 I have provided the driving shaft 23 which is journaled in suitable bearings 24 carried at the upper end of the bracket 22 which is supported on the stand 12 and which has thereon two oppositely-disposed beveled gears 25, 26, that are adapted to mesh with a bevel gear 27 that is connected to or rigid with the driving pinion 21.

The bevel gears 25 and 26 are rigid with each other, they being rigidly connected by a sleeve 28 that is splined to the shaft 23. One end of this sleeve is acted on by a suitable spring 29 which is confined between the bearing 24 and the hub of the gear 25, said spring acting normally to carry the gears 25 and 26 toward the right, Fig. 1, and to maintain the bevel gear 25 in engagement with the bevel gear 27. The shaft 23 may be rotated in any suitable way, as by means of a driving pulley 141, or a wheel 30 which may be operated by hand. When the parts are in this position and the bevel gears 25 and 27 are in mesh the rotation of the shaft 23 will turn the pinion 21 in a direction to lower the rack bar 20 and the head 5.

For automatically reversing the direction of movement of the pinion when the head has reached the lower limit of its movement I have provided a reversing cam which is arranged to shift the sleeve 28 with the gears 25 and 26 longitudinally of the shaft 23 thereby disengaging the gear 25 from the gear 27 and bringing the gear 26 into mesh with said gear 27. This reversing cam is shown in Fig. 4 and is designated 32. It is carried by a collar 33 which is fast on a shaft 23, and as said shaft rotates the cam 32 engages a yoke 35 which embraces the stand 22 and also embraces the gears 25 and 26.

The engagement of the cam with one arm of the yoke moves said yoke to the left, Figs. 10 and 14, thereby shifting the sleeve 28 and the gears 25, 26, as above described, and bringing the gear 26 into mesh with the gear 27.

With the gears held in their new position the continued rotation of the shaft 23 in the same direction will obviously cause the driving pinion to rotate in the reverse direction and will consequently elevate the said head.

It is necessary to hold the gear 26 in mesh with the gear 27 until the head has been elevated and to accomplish this I provide the yoke with a locking notch 39 which is adapted to have locking engagement with a catch 40 extending from the stand 22 when said yoke has been moved to the left Fig. 1 or to the right Fig. 6.

41 is a spring yieldingly engaging the yoke and serving to hold the locking notch in engagement with the catch. The shape of the notch and catch is such that as the yoke moves to the right Fig. 6, the notch is automatically thrown into engagement with the catch by the spring 41 and said yoke will thus be retained in this position with the gear 25 in mesh with the gear 27 until said notch is released from the catch.

The shifting of the sleeve 28 to the left, Fig. 1, puts the spring 29 under tension so that when the notch 39 is released from the catch 40, said spring operates to shift automatically the gears 25 and 26 thereby to bring the bevel gear 25 into mesh again with the bevel gear 27 and carry the bevel gear 26 out of mesh therewith, thus reversing the direction of rotation of said gear 27.

I have in my present embodiment provided means for automatically releasing the yoke from the catch 40 at the proper time. For this purpose I have provided a releasing device 50 which is pivotally mounted on a pin 51 carried by the stand 22, and which has one arm 52 extending underneath the yoke 35 and another horizontally-arranged arm 53 which is bent forwardly at its end, as at 54.

Fast on the shaft 23 is a disk or collar 55 having a tooth 56 which tooth is adapted to engage the bent end 54 of the releasing device 50 as said disk rotates in the direction of the arrow Fig. 8, and thus depress the arm 53 thereof. The depression of the arm 53 raises the arm 52 against the underside of the yoke 35 and lifts said yoke sufficiently to release the lock 39 from the catch 40. As soon as this occurs the spring 29 shifts the sleeve 28 with the two bevel gears 25 and 26 thereon and thus reverses the direction of movement of the pinion 21.

The tooth 56 is so placed as to cause this reversal to take place as soon as the head 5 has been carried to the upper end of its stroke.

With the construction herein shown it is simply necessary to place a barrel on the base 3 with a hoop thereon in position to be driven and then turn the shaft 23, the rotation of said shaft operating first to lower the head 5 and hoop-engaging arms 6 thereby driving the hoop, and then to automatically reverse the direction of movement of the driving pinion 21 thus elevating the head 5 and carrying the parts into the position shown in Figs. 1 and 2. When the parts have reached this position the driving mechanism is again automatically reversed so that on further rotation of the shaft 23 the head 5 will be lowered again.

To make the apparatus capable of applying hoops to barrels of different sizes I have provided an adjusting device for adjusting the jaws 6 radially. The head 5 carries a plurality of radially adjustable slides 60, one for each of the arms 7, to each of which slides one of the arms 7 is pivoted. The adjustment of these slides radially will obviously move the jaws 6 in a radial direction. Each slide 60 is guided in its radial movement in a suitable pocket or recess formed in the head 5, and as a convenient means for securing the desired radial adjustment I have pivoted to each slide one end of a link 61, the other end of which is pivoted to the periphery of an adjusting wheel 62. This adjusting wheel 62 is mounted to turn on a stud on the lower side of the head 5 and has rigid therewith the worm gear 63 with which meshes a worm 64. The shaft of the worm 64 is journaled in suitable bearings 65 carried by the head 5 and is provided at its end with a handle or thumb-piece by which the shaft may be turned. The turning of the shaft will turn the adjusting wheel 62 and the slides 60 will thus be forced inwardly or drawn outwardly depending on the direction in which the adjusting wheel 62 is turned.

When the wheel is situated so that the links 61 stand exactly radially to the wheel, the slides 60 are in their extreme outward position, and as said wheel is turned to carry the links into the dotted position shown in Fig. 11, the slides 60 are drawn inwardly as will be obvious. This particular manner of adjusting the slides is not essential to my invention however.

The base 3 is preferably bent downwardly at its front edge, as at 70, so as to facilitate the placing of barrels thereon or the removal of the barrels therefrom.

I have not described herein all embodiments of my invention but have in the drawings shown one embodiment which is sufficient to illustrate the principle of the invention.

Having described my invention what I claim as new and desire to secure by Letters Patent is:—

1. In a barrel-hooping machine, the combination with a base, of a head, means to raise and lower said head, vertically-extending arms pivoted intermediate of their ends to said head, hoop-engaging jaws carried by the lower ends of said arms, and links pivoted at their inner ends to a fixed support and having a sliding pivotal connection with the upper ends of the arms.

2. In a barrel-hooping machine, the combination with a base, of a fixed head above the base, a vertically-movable head situated between the fixed head and the base, arms pivoted between their ends to the vertically-movable head, a hoop-engaging jaw at the lower end of each arm, and links pivoted at one end to the fixed head and at the other end to the upper ends of said arms.

3. In a barrel-hooping machine, the combination with a base, of a fixed head above the base, a vertically-movable head, arms pivoted between their ends to the vertically-movable head, a hoop-engaging jaw at the lower end of each arm, and a link pivotally connecting the upper end of each arm to the fixed head, each link having a sliding pivotal connection with its arm.

4. In a barrel-hooping machine, the combination with a base, of a fixed head above the base, a vertically-movable head, arms pivoted between their ends to the vertically-movable head, a hoop-engaging jaw at the lower end of each arm, a link pivotally connecting the upper end of each arm to the fixed head, each link having a sliding pivotal connection with its arm, and a spring acting on the upper end of each arm.

5. In a barrel-hooping machine, the combination with a base, of a head fixedly sustained above the base, a vertically-movable head situated between the fixed head and the base, radially-adjustable slides sustained by the movable head, means to adjust the slides radially, a vertically-extending arm pivoted intermediate of its end to each slide, a hoop-engaging jaw at the lower end of each arm, a plurality of links, one for each arm pivoted to the fixed head, and each link having a yielding connection with the upper end of the corresponding arm.

6. In a barrel-hooping machine, the combination with a base, of a head fixedly sustained above the base, a vertically-movable head situated between the fixed head and the base, slides sustained by the vertically-movable head, means carried by said head for adjusting the slides radially, a vertically-extending arm pivoted intermediate of its ends to each slide, a hoop-engaging jaw at the lower end of each arm, and links, one for each arm, pivoted at their inner ends to said fixed head, each link having a sliding pivotal connection with its arm, and a spring surrounding each link and tending to swing the jaws inward.

7. In a barrel-hooping machine, the combination with a base, of a head, means to lower said head, vertically-extending arms pivoted intermediate of their ends to said head, hoop-engaging jaws carried by the lower ends of said arms, links pivoted at their upper ends to a fixed support and having a pivotal sliding connection with the upper ends of the arms, a rack-bar secured to the head, a pinion meshing with the rack-bar, a driving shaft, and means controlled by the rotation of the driving shaft to rotate said pinion first in one direction and then in the other.

8. In a barrel-hooping machine, the combination with a head, of hoop-engaging jaws carried thereby, a rack bar secured to the head, a pinion meshing with the rack bar, a bevel gear rigid with the pinion, a driving shaft, two oppositely-disposed bevel gears thereon, each adapted to mesh with the first-named bevel gear, a spring tending normally to keep one of the bevel gears on the driving shaft in mesh with said first-named bevel gear, a cam on the driving shaft operating to shift positively said bevel gears longitudinally of the shaft and oppositely to said spring thereby to reverse the direction of rotation of the pinion.

9. In a barrel-hooping machine, the combination with a head, of hoop-engaging jaws carried thereby, a rack bar secured to the head, a pinion meshing with the rack bar, a bevel gear rigid with the pinion, a driving shaft, two oppositely-disposed bevel gears thereon, each adapted to mesh with the first-named bevel gear, a spring tending normally to keep one of the bevel gears on the driving shaft in mesh with said first-named bevel gear, a cam operated by the driving shaft to shift said bevel gears longitudinally in opposition to said spring, and an automatically-acting lock to maintain said bevel gears in their shifted position.

10. In a barrel-hooping machine, the combination with a head, of hoop-engaging jaws carried thereby, a rack bar secured to the head, a pinion meshing with the rack bar, a bevel gear rigid with the pinion, a driving shaft, two oppositely-disposed bevel gears thereon, each adapted to mesh with the first-named bevel gear, a spring tending normally to keep one of the bevel gears on the driving shaft in mesh with said first-named bevel gear, means operated by the driving shaft to shift said bevel gears longitudinally, an automatically-acting lock to maintain said bevel gears in their shifted position, and means to release the lock by the rotation of the driving shaft.

In testimony whereof, I have signed my name to this specification, in the presence of two subscribing witnesses.

JOHN HENCY.

Witnesses:
IDA HENCY,
G. H. PEDDLE.